(12) United States Patent
Leon et al.

(10) Patent No.: US 8,496,749 B2
(45) Date of Patent: *Jul. 30, 2013

(54) ADDITIVE MIX FOR ASPHALT MIXTURE PREPARATION

(75) Inventors: Juan Antonio Gonzalez Leon, Lyons (FR); Gilles Barreto, Messimy (FR); Vincent Luca, Solaize (FR); Eric Jorda, Narberth, PA (US)

(73) Assignee: CECA S.A. (FR)

( * ) Notice: Subject to any disclaimer, the term of this patent is extended or adjusted under 35 U.S.C. 154(b) by 403 days.

This patent is subject to a terminal disclaimer.

(21) Appl. No.: 12/830,741

(22) Filed: Jul. 6, 2010

(65) Prior Publication Data

US 2011/0005429 A1    Jan. 13, 2011

Related U.S. Application Data

(60) Provisional application No. 61/225,975, filed on Jul. 16, 2009.

(30) Foreign Application Priority Data

Jul. 8, 2009  (FR) ..................... 09 03357

(51) Int. Cl.
*C08L 95/00* (2006.01)

(52) U.S. Cl.
USPC ................. 106/284.1; 106/281.1; 106/282; 106/503; 524/59; 524/69; 524/71

(58) Field of Classification Search
USPC ............. 106/284.1, 281.1, 282, 503; 524/59, 524/69, 71

See application file for complete search history.

(56) References Cited

U.S. PATENT DOCUMENTS

| 5,990,206 | A | * | 11/1999 | Tanaka et al. | 524/59 |
| 6,024,788 | A | * | 2/2000 | Tomioka et al. | 106/281.1 |
| 6,261,356 | B1 | * | 7/2001 | Isobe et al. | 106/284.1 |
| 7,951,858 | B2 | * | 5/2011 | Barreto et al. | 524/71 |
| 7,985,787 | B2 | * | 7/2011 | Martin | 524/59 |
| 2009/0054562 | A1 | * | 2/2009 | Martin | 524/59 |
| 2009/0249978 | A1 | * | 10/2009 | Martin et al. | 106/284.1 |
| 2010/0192805 | A1 | * | 8/2010 | Barreto et al. | 106/281.1 |

FOREIGN PATENT DOCUMENTS

| JP | 10/182981 | * | 7/1998 |
| WO | WO 2008/148974 A2 | * | 12/2008 |

OTHER PUBLICATIONS

English translation of JP 10/182981, Jul. 1998.*
Polyphosphoric Acid Information Sheet from www.thermphos.com/Home/Products/PandP%20Derivatives.PPA.aspx; 2 pages; no date available.*

* cited by examiner

*Primary Examiner* — Helene Klemanski
(74) *Attorney, Agent, or Firm* — RatnerPrestia

(57) ABSTRACT

The present invention relates to bitumen additive mixtures, their use and application for the fabrication of asphalt mixtures used in pavement and waterproofing, and more specifically for construction, repair and maintenance of sidewalks, roads, highways, parking lots or airport runaways and service roads and any other rolling surfaces.

23 Claims, No Drawings

ADDITIVE MIX FOR ASPHALT MIXTURE PREPARATION

This application claims priority to U.S. Provisional Application Ser. No. 61/225,975 filed Jul. 16, 2009

FIELD OF INVENTION

This invention relates to bitumen additive mixtures, their use and application for the fabrication of asphalt mixtures. Examples of applications for the present invention are the production of asphalts mixtures with mineral aggregates used in pavement and waterproofing, and more specifically for construction, repair and maintenance of sidewalks, roads, highways, parking lots or airport runaways and service roads and any other rolling surfaces.

BACKGROUND

Bitumen or asphalt is the heaviest portion from the oil distillation process. Due to the different origins and distillations processes of such oils, the resulting bitumen may have a wide range of properties and characteristics. In the present invention, bitumen refers not only to the product from oil by direct distillation or from distillation of oil at reduced pressures, but as well to the products coming from the extraction of tar and bituminous sands, the products of oxidation and/or fluxation with carbonated solvents including paraffins and waxes of such bituminous materials, as well as blown or semi-blown bitumens, synthetic bitumens (such as those described for example in FR-A-2 853 647), tars, oil resins or indene-coumarone resins mixed with aromatic and/or paraffinic hydrocarbons and the mixtures of such, the mixtures of such bituminous materials with acids and the like.

The main application for bitumen is in asphalt mixtures where the bitumen is mixed with mineral aggregates that can be of different size, shape and chemical nature. These asphalt mixtures are particularly used for construction, repair and maintenance of sidewalks, roads, highways, parking lots or airport runaways and service roads and of any other rolling surfaces. In the present invention mineral aggregates are the product from quarries as well as aggregates recuperated from previous asphalt mixtures (Reclaimed Asphalt Pavement, RAP, as described for example in the AFNOR XP P98-135, December 2001, Asphalt Handbook, MS-4 7$^{th}$ edition, published by the Asphalt Institute, USA), products from building demolition and their mixtures. Other common components in asphalt mixtures are organic and inorganic fibers, such as glass, metal or carbon fibers, as well as cellulose, cotton, polypropylene, polyester, polyvinyl alcohol and polyamide fibers.

The bitumens, as defined above, are however sparingly used as such for the production of asphalt mixtures, mainly because of the unsatisfying mechanical properties of such mixtures. A number of various additives have therefore been developed since many years to reach satisfying asphalt mixtures that can withstand traffic wear and atmospheric conditions.

Polyphosphoric acid (PPA) is a commonly used bitumen modifier, which is capable of enhancing the mechanical properties of the bitumen. The effect of PPA on bitumen is well documented in the literature as described for example in FR-A-2 065 076, and in the article by J. F. Masson in "Energy and Fuels", (2008), vol. 22, page 2637. PPA is able to modify the specification grade of the bitumen towards a harder one. Its use increases the ring and ball temperature, viscosity and reduces the penetration grade. As a consequence, it is useful to reduce the rutting of the road and increase the mechanical modulus of the asphalt mixture. As another consequence, it is necessary to increase the process temperatures for mixing the modified bitumen with the aggregates, storing, transporting, laying and compacting in comparison with asphalt mixtures employing neat bitumen.

In the present invention, polyphosphoric acid refers to all different existing grades and designations of polyphosphoric acids including pyrophosphoric acid, triphosphoric and metaphosphoric acids with 2 or more repeating units. Polyphosphoric acid also refers to the blends of two or more different polyphosphoric acids grades. Polyphosphoric acids according to the invention may further include one or more of phosphorous-containing moieties such as orthophosphoric acid, phosphoric anhydride ($P_2O_5$), phosphonic acid, pyrophosphates, and other similar compounds comprising at least one (OH—)P=O group.

Lately, there has been a lot of interest in reducing the production temperature of hot mix asphalts. Such interest in reducing the production temperatures of asphalt mixtures is not just driven by the energy savings and reduction of polluting emissions; it is also driven by the possibility to increase the asphalt mixture hauling time and the extension of the working season. Several solutions have been proposed, which consist in the addition of some kind of additives.

One of those solutions was exposed in U.S. Pat. No. 7,297,204 describing a method to produce an asphalt mixture at reduced temperatures by the addition of a water-in-oil dispersion. The water-in-oil dispersion includes one or several surfactants to allow for the dispersion of the water into the bitumen. Although this method provides a way to reduce the production temperature of an asphalt mix it would be incompatible with the polyphosphoric acid due to its great hygroscopic behavior. The contact of water with the polyphosphoric acid would break the chains of the acid into its elemental units, chains which are though responsible for it beneficial effects (J. F. Masson, ibid.). Further more, the PPA might be incompatible with many of the surfactant chemistry described in the text based on their basic nature.

In WO 2006/106222 and WO 2007/141458 different types of additives for the production of asphalt mixtures at reduced temperatures are described. The therein claimed additives do not lead to a change of the bitumen classification (penetration and ring and ball temperatures remain substantially unchanged). Actual field test are used as examples, showing that a reduction of about 40° C. up to 55° C. in the production and in the compaction of the asphalt mixture is possible, while achieving a good compaction level. The described additives are easy and simple to mix into the bitumen.

The procedures described in these documents also include waterless processes, which should be advantageous for the combined use with polyphosphoric acid. However, their combined use with polyphosphoric acid is not mention or described. The combined effect of such additives admixed with the highly reactive polyphosphoric acid cannot be easily predicted, in particular since the real mechanism of how the polyphosphoric acid enhances the bitumen properties is not fully understood. (J. F. Masson, ibid.).

Several advantages result from the reduction of production temperature, as described in many of the works cited above. These advantages include, among others:
  Reduction of the fuel used in the production process.
  Reduction of polluting emissions, related to the fuel consumed and the lower to temperature of the asphalt mixture.
  Improving of the workers conditions during the laying off and compaction operations.

Better joint sealing between lanes posed at different times.
Decreasing of the bitumen oxidation during production of the asphalt mixture, extending the pavement life.

In addition, the ability to lay off and compact an asphalt mix at lower temperatures can compensate for the supplementary cooling encountered when the hauling time is longer or/and when the weather conditions are cooler.

There is still a need for bitumen additives that can combine the beneficial effects and the advantageous properties of both:
the above mentioned additives for the production of asphalt mixtures at reduced temperatures, and
polyphosphoric acid for its final mechanical performances it confers to asphalt mixtures in wear conditions during the whole life of the rolling surfaces.

BRIEF DESCRIPTION OF THE INVENTION

The invention described here consists in an additive mixture comprising polyphosphoric acid and at least another selected chemical additive. The additive mixture (briefly referred to as "additive mix") described in this invention is capable of enhancing the mechanical properties of bitumen and at the same time capable of allowing the production at reduced temperatures of an asphalt mixture produced with such additive mix-containing bitumen. Another object of the present invention is a bituminous composition prepared with this additive mix, its use to produce asphalt mixtures and its applications.

Examples of applications of the additive mix of the present invention are the production of asphalts mixtures with mineral aggregates used in waterproofing, construction or maintenance of sidewalks, roads, highways, parking lots or airport runaways and service roads, as well as any other rolling surfaces.

DETAILED DESCRIPTION OF THE INVENTION

According to a first aspect, the present invention relates to an additive mixture comprising:
a) at least one polyphosphoric acid and,
b) at least one compound comprising at least one alkylene oxide repeating unit, and/or comprising at least one (P=O) moiety.

It has been surprisingly discovered that the compounds defined under b) above, which are generally known to be used for the production asphalt mixtures at reduced temperatures, are particularly well compatible with phosphoric acid(s), without the properties of polyphosphoric acid(s) and of the said compounds b) being substantially altered. This results in a particularly efficient additive mix for bitumen, as described further in the description and as illustrated by the examples.

Preferably, the compound as defined under b) above comprises from 2 to 1000 propylene oxide (PO) and/or ethylene oxide (EO) repeating units, even more preferably from 4 to 500 propylene oxide (PO) and/or ethylene oxide (EO) repeating units.

The additive mix of the present invention comprises from 0.3% to 97.5% by weight, and preferably from 4% to 66% by weight, of one or more additives defined under b) above, the remaining part to 100% being a polyphosphoric acid (PPA), or a mixture of different PPA grades. In the additive mix according to the present invention, the molar ratio [polyphosphoric acid (or mixture of different PPA grades)]/[compound comprising at least one alkylene oxide repeating unit defined under b) above] advantageously ranges between 2 and 4, this molar ratio preferably being of about 3.

According to a preferred aspect, the additive mix of the present invention comprises at least one polyphosphoric acid and at least one compound defined under b) above, said at least one additive b) being of formula (A1) or formula (A1$_B$):

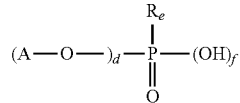

wherein
A is chosen from among hydrogen and a group G or

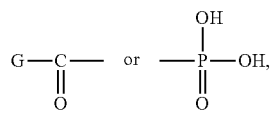

G represents a linear or branched, saturated or unsaturated, $C_1$-$C_{30}$ hydrocarbon chain, optionally containing at least one aromatic cycle, and optionally substituted by at least one phosphate group, preferably one phosphate group,
B represents a divalent group containing at least one alkylene oxide repeating unit,
d represents 1 or 2, and
Z represents a radical of formula B1:

wherein P represents phosphorus, R is hydrogen or linear or branched $C_1$-$C_6$ alkyl, f is 0 or 1 or 2, e is 0 or 1, d+e+f is 3,
provided that when d is 2, then e is 0 and P is linked to two identical or different, preferably identical, groups [A-O—B—] or [A-O—], as defined above, and only in the case where d is 1, Z may also represent hydrogen or a group G or

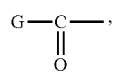

wherein G is as defined above.

In the present invention alkylene oxide preferably means butylene oxide (BO), propylene oxide (PO) or ethylene oxide (EO), it being understood that a "divalent group containing at least one alkylene oxide repeating unit" is a divalent group that may comprise BO and/or PO and/or EO repeating units.

More preferably, B represents a divalent group containing propylene oxide (PO) and/or ethylene oxide (EO) repeating units, generally statistically arranged or in blocks, preferably in blocks. Even more preferably B is a statistical or block copolymer of ethylene oxide and propylene oxide with 4 to 500 repeating units, with a mass ratio (ethylene oxide/copolymer) between 1% and 70%.

According to another embodiment of the present invention, the said PO and/or EO repeating units are bonded to Z by a single bond or by a linear or branched hydrocarbon chain with, preferably, one, two or three carbon atoms. Preferably, the PO and/or EO repeating units are directly bonded to Z (single bond), the oxygen atoms of OP or OE repeating units are bonded to Z. Preferably, B comprises, and preferably represents, —(CH$_2$CH(CH$_3$)O)$_g$—(CH$_2$CH$_2$O)$_h$—, block or statistically arranged, where g is between 0 to 10, and h is comprised between 0 and 80, preferably between 8 and 80, and more preferably between 20 and 60. In this case, A1 may be represented by formula A1$_O$:

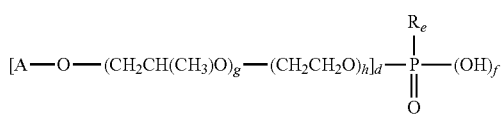

(A1$_O$)

wherein A, R, d, e, f, g and h are as described above.

Alternatively, when the PO and/or EO repeating units (block or statistically arranged) are bonded to Z by a hydrocarbon chain, component A1 can advantageously be described by the following formula A1$_C$:

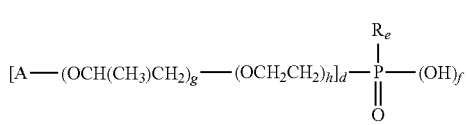

(A1$_C$)

wherein A, R, d, e, f, g and h are as described above.

According to a preferred embodiment, in the additive of general formula A1, g represents 0, when A contains at least 10 carbon atoms. Still according to a preferred embodiment, in the additive of general formula A1, g is comprised between 8 and 80, preferably between 20 and 60, when A contains less than 10 carbon atoms.

According to another aspect of the present invention, B may represent a single bond, and in this case A1 may be represented by formula A1$_B$:

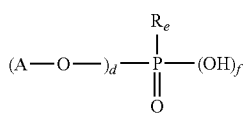

(A1$_B$)

where A, R, d, e and f are as described above.

According to still another embodiment of the present invention, A and Z each represent hydrogen and B is a statistical or block copolymer of ethylene oxide and propylene oxide with 4 to 500 repeating units, with a mass ratio (ethylene oxide/copolymer) between 1% and 70%. Preferably, B is a triblock copolymer with the propylene oxide forming the middle block. In this case A1 may be represented by formula A1$_H$:

H—O—(CH$_2$CH$_2$—O)$_x$—(CH$_2$—CH(CH$_3$)O)$_y$—
(CH$_2$CH$_2$—O)$_z$—H    (A1$_H$)

where x, y and z are the number of repeating units of each kind, the sum x+y+z ranging from 4 to 500 and the ratio 44(x+z)/(44(x+z)+57y) ranging from 0.1 to 0.7.

According to a further embodiment of the present invention, A represents hydrogen, d is 1, Z represents a group G or

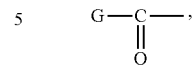

wherein G represents a linear or branched, saturated or unsaturated, C$_1$-C$_{30}$ hydrocarbon chain, optionally containing at least one aromatic cycle, and B represents a divalent group containing at least one propylene oxide repeating unit (PO) and/or at least one ethylene oxide repeating unit (EO).

According to still another aspect of the present invention, the additive A1 is as defined above, wherein d is equal to 1, Z represents B1, B is as defined above, and A represents

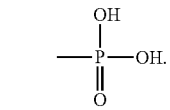

The compound of formula [A-O—B—]$_d$Z, in which d is 1, Z is

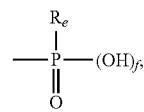

wherein R is hydrogen or linear or branched C$_1$-C$_6$ alkyl, f is 0 or 1 or 2, e is 0 or 1, it being understood that d+e+f=3, B represents a divalent group containing at least one alkylene oxide repeating unit, and A represents

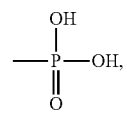

is new and thereby forms a further object of the present invention.

Preferred is the above compound in which e=0, f=2 and B represents a divalent group containing at least one ethylene oxide (OE) and/or propylene oxide (OP) repeating unit as defined above.

According to still a further aspect of the present invention, the additive mix comprises at least one additive A1, wherein d is 2, in which case said additive A1 may be represented by formula A1$_2$:

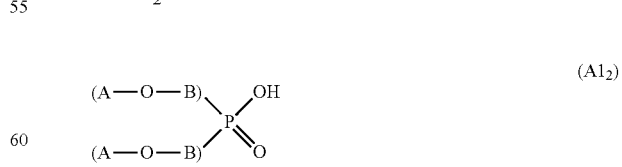

(A1$_2$)

wherein the two groups (A-O—B—) may be identical or different, preferably identical, A and B being as defined above.

In a preferred embodiment, the additive A1 of the present invention has not more than 3 phosphorous atoms.

Non limiting examples of additives of formula A1 described above include the additives disclosed in WO 08/148,974, the products from the reaction between a polyalkylene glycol and a phosphorous oxychloride or phosphorous pentoxide, the Pluronic®, Radiasurf® 7480 and 7417, and the like.

All additives A1 defined herein before, including $A1_O$, $A1_C$, $A1_B$, $A1_H$, $A1_2$, are known compounds and are readily available from known suppliers, or alternatively are easily prepared from known procedures, which are available in patents or non-patent literature, in scientific publications, in the Chemical Abstracts, and on the Internet.

The additive mix of the present invention as defined above may be prepared by mixing the at least one polyphosphoric acid together with the at least one compound of general formula A1, in the proportions stated above. When one or more components, or all components are in solid form, mixing may be realized in one solvent or a mixture of solvents.

Suitable solvent(s) may be of any kind known in the art, preferably organic or hydro-organic solvent(s). As the additive mix is intended for use in bitumen, without the further addition of water, water or hydro-organic solvent(s) are less preferred for the preparation of the additive mix of the present invention. Alternatively, the additive mix can be in the form of an emulsion with the polyphosphoric acid dispersed in or as the continuous phase.

Another object of the present invention is a bituminous composition comprising at least one bitumen and from 0.05 to 10% by weight of at least one additive mix as defined above. Preferably, the bituminous composition of the invention comprises at least one bitumen and from 0.5 to 5% by weight of at least one additive mix as defined above.

In the present invention "bitumen" means a bituminous material resulting from the distillation of oil under atmospheric or reduced pressure, the product resulting from the extraction of tar and bituminous sands, the product of oxidation and/or fluxation of such bituminous materials with carbonated solvents including paraffins and waxes, as well as blown or semi-blown bitumens, synthetic bitumens (such as described in FR 2 853 647), tars, oil resins or indene-coumarone resins mixed with aromatic and/or paraffinic hydrocarbons and the mixtures of such.

The bituminous composition described in this invention may further comprise one or more other additives such as those commonly used in the field of bitumen and asphalts.

These may include anti-stripping agents, generally anionic, cationic, zwitterionic or amphoteric surfactants, preferably anionic surfactants, or quaternary ammonium surfactants or zwitterionic surfactant. Non-limiting examples of such anti-stripping agents are: sulfated surfactants, sulfonated surfactants, alkyl or aryl carboxylic acids, fatty acid esters of quaternary alkanol amines, alkyl amido polyamines, alkyl imidazolines and alkyl imidazo polyamines, the products from the reaction between polyamines and fatty carboxylic acids, the products from the reaction between alkyl polyamines and fatty carboxylic acids, and in a similar manner, the products from the reaction between fatty acids or vegetable oil and diethanolamine, followed by the reaction with polyamines. Non-limiting examples of quaternary alkanol amines are betain salts and N,N,N-trialkyl choline salts with strong organic or inorganic acids, such as for example (methane)sulfonic acid. The polyamines are, as non-limiting examples, dimethyl amino propylamine, N-amino ethyl piperazine, diethylene triamine, triethylene tetramine and tetraethylene pentamine.

Other additives that may be advantageously added to the bituminous composition described in this invention are chosen from among phosphoric anhydride ($P_2O_5$), phosphonic acid, pyrophosphates, and other similar compounds comprising at least one (OH—)P=O group, polymers, generally used in order to improve the mechanical performance of the bitumen and the asphalt mixture, paraffins, for example Fischer-Tropsch paraffins described in U.S. Pat. No. 6,588,974, fluxants, esters of fatty acids and functionalized wax, dialkyldiamides as for example those cited in WO 2007/73378, fluxant oils from vegetable or mineral sources and derivatives thereof, as well as mixtures of two or more of the above additional additives.

Other additives that may be advantageously added to the bituminous composition described in this invention are chosen from among those used to reduce the production temperature of an asphalt mixture described in WO 2006/106222.

Non-limiting examples of polymers generally used in order to improve the mechanical performance of the bitumen and the mixture, i.e. commonly used in the modification of bitumen are: styrene butadiene rubbers, styrene/butadiene block copolymers, ethyl vinyl acetate copolymers, polyethylene and other alpha-polyolefins (as disclosed in "Asphalt binder testing manual", Asphalt Institute 2007).

The bituminous composition may be prepared by direct addition of the additive mix, as a mixture or as separate components, into the storage tank of bitumen or by direct in-line addition of the additive mix into the bitumen pipe before its use for asphalt mixture production.

It is as well in the scope of this invention to add the additive mix, as a mixture or as separate components, directly during the preparation process of the asphalt mixture (mixing bitumen and mineral aggregates).

It might be advantageous to prepare the bitumen composition containing the additive mix according to the invention, and store it for a given period of time, generally ranging from a few or several days to several weeks before its use, for example for the production of asphalt mixtures. Such stored bituminous composition may further enhance the workability of the asphalt mixture at a reduced temperature, resulting in an even more effective compaction, leading to even better final mechanical properties of the asphalt mixture.

Surprisingly, the additive mix described in this invention improves the mechanical properties of the bitumen in a similar manner to an equivalent amount of pure polyphosphoric acid. In addition, the additive mix provides a better workability of asphalt mixtures produced with the bituminous composition containing the invention.

The great majority of known adhesion agents generally improve only the cohesion at the aggregate-bitumen interface, without providing sufficient workability for allowing an asphalt mixture production and paving temperature reduction.

The additive mix of the invention allows for the complete coverage of the mineral aggregates and provides adequate workability to allow a temperature reduction in the production and paving of asphalt mixtures. This improvement of workability provided by the additive mix of the invention allows the production of asphalts mixtures at temperatures of 20° C., preferably of 30° C., more preferably of 40° C., and even up to 50° C., below the standard production temperatures for each kind of bitumen while enhancing the mechanical properties of the bitumen.

Without the use of the additive mixture of the invention and keeping the temperature lower than the standard temperature for the asphalt mixture, problems may arise such as mixing with uncomplete aggregates coverage, bad workability leading to defects of paver screed feeding, bad compaction, and defects in paved rolling surfaces.

By "standard temperature" is meant a temperature generally ranging from 100° C. to 260° C., preferably 100 to 200° C. As indicated above, this standard temperature depends on the nature of the bitumen, as is well known to the skilled in the art. For example NF EN 13108-1 of February 2007 indicates the following temperature ranges:
- 160° C. to 200° C. for bitumen type 20/30 (1/10 mm);
- 155° C. to 195° C. for bitumen type 30/45 (1/10 mm);
- 150° C. to 190° C. for bitumen type 35/50 or 40/60 (1/10 mm);
- 140° C. to 180° C. for bitumen type 50/70 or 70/100 (1/10 mm);
- 130° C. to 170° C. for bitumen type 100/150 or 160/220 (1/10 mm); and
- 120° C. to 160° C. for bitumen type 250/330 or 330/430 (1/10 mm).

The bituminous composition described here can be used to prepare, in combination with mineral aggregates, asphalt mixtures by any asphalt production method. These methods may include other processes for asphalt mixture production at reduced temperatures (where production temperature is above room temperature but below that in regular hot mixing process), for example as described in U.S. Pat. No. 5,910,212 and WO 97/20890 which uses a hard bituminous binder combined to the mixture of a soft bituminous binder and aggregates, or in US 2005/0076810 that uses a high desorption capacity additive, or in EP 1 469 038 in which a part of the aggregates is heated and dried and mixed with bitumen and then after mixed with wet aggregates, or in US 2006/00236614 in which the aggregates are dried and mixed with bitumen but with the drying step, so that a fraction of the initial humidity of the aggregates remains, or else in US2008/0259714 where a particular bitumen foaming device is described to achieve the coverage of the mineral aggregates.

Preferably, the process to produce an asphalt mixture at reduced temperatures by using the bituminous composition described above is as follow:
i) heating of the mineral aggregates to a reduced temperature compared to standard hot mix asphalts, i.e. of 20° C., preferably of 30° C., more preferably of 40° C., and even up to 50° C., below the standard temperature required for the bitumen grade used.
ii) mixing the heated mineral aggregates with the bituminous composition containing 0.05% to 10% by weight of the additive mix described in this invention (bituminous composition that is stored hot, at the standard temperature for each bitumen grade).
iii) obtaining an asphalt mixture According to an alternative of the above process, the at least one polyphosphoric acid and the at least one component b) may be added separately, typically by means of two separated feed lines, into the bitumen and the mineral aggregates, the all four items being thoroughly mixed together.

The asphalt mixtures comprising mineral aggregates and at least one bituminous composition as defined above also form another object of the present invention.

The mineral aggregates used to fabricate asphalt mixtures according to the present invention are not limited in chemical nature, shape or size and may be the products from quarries, aggregates recuperated from previous asphalt mixtures (reclaimed asphalt pavement, RAP for example defined in the French Standard AFNOR XP P98-135 of December 2001, or in Asphalt Handbook, MS-4 7$^{th}$ edition, published by the Asphalt Institute, USA), products from building demolition and mixtures of any of the above.

Asphalt mixtures prepared with at least one bituminous composition prepared according to the preparation process of the present invention may comprise other common components of asphalt mixtures such as organic fibers (for example: cellulose, cotton, polypropylene, polyester, polyvinyl alcohol and polyamide fibers) and/or inorganic fibers (for example: glass, metal or carbon fibers).

The reduction in the production temperature by using the bituminous compositions comprising the additive mix described in this invention has many advantages, among others a reduction in the consumed energy during asphalt mix production since the mineral aggregates do not have to be heated as much as in the production with regular bitumen. In addition, this reduction of energy also implies a reduction in $CO_2$ and other greenhouse effect gas emissions.

The main application for the asphalt mixture preparation process described in this invention is the construction of a rolling surface, such as roads, parking lots, bridges, motorways, highways, airport runaways or any similar rolling surface, and also any surface requiring bituminous or asphalt coating, such as pavements, side walks, playgrounds and the like.

Other uses of the described invention may also include the preparation of roofing and other waterproofing applications.

The invention is further illustrated with the following examples which do not intend to limit the scope of the present invention, the scope of which is as defined in the annexed claims.

EXAMPLE 1

Bituminous compositions were prepared by adding different additive mixtures into a bitumen with a penetration grade of 50/70 [1/10 mm]. The bitumen was preheated to 160° C. and the different additive mixes were added into it while gently stirring for 15 minutes.

Composition 1 was prepared by mixing 100 g of 50/70 bitumen with 1.3 g of an additive mix of the following composition: 77 wt % polyphosphoric acid (115% $H_3PO_4$ basis Sigma Aldrich) and 23 wt % of an additive with chemical formula $(A-O-(CH_2CH(CH_3)O)_g-(CH_2CH_2O)_h)_d-P(=O)-OH_f$ with a value of d between 1 and 2, d+f equal to 3, g equal to 0, h equal to 4 and A being a linear hydrocarbon chain having between 16 and 18 carbon atoms, commercialized by CECA under the trade name Beycostat® A684.

Composition 2 was prepared by mixing 100 g of 50/70 bitumen with 1.3 g of an additive mix of the following composition: 77 wt % polyphosphoric acid (115% $H_3PO_4$ basis Sigma Aldrich) and 23 wt % of an ethylene oxide and propylene oxide block copolymer with a total molar mass of about 3400 g/mol and a mass ratio ethylene oxide/propylene oxide of 20%, commercialized by BASF under the trade name Pluronic® L92.

Composition 3 was prepared by mixing 100 g of 50/70 bitumen with 1.3 g of an additive mix of the following composition: 77 wt % polyphosphoric acid (115% $H_3PO_4$ basis Sigma Aldrich) and 23 wt % of an ethoxylated fatty acid diamine commercialized by CECA under the trade name Dinoramox S12®.

The rheological properties of Compositions 1, 2 and 3 were measured at 60° C. by means of the Multiple Stress Creep and Recovery test as described in ASTM D7405-08. The percentage recovery and compliance values at 3.2 kPa for each composition are shown in Table 1. The values for the pure 50/70 bitumen and the bituminous composition prepared by mixing 100 g of 50/70 bitumen with 1 g of polyphosphoric acid are also shown for comparison.

The beneficial effect of the PPA to the bitumen is evidenced by the increase of its % recovery and significant reduction of its compliance. Almost identical effects were obtained with compositions 1 and 2 by the addition of the respective additives mixes. However, composition 3, containing an additive mix that is not according to the present invention, result in a significant decreased effect of the PPA in the composition, both in % recovery and compliance.

TABLE 1

MSCR tests of bituminous compositions at 60° C.

|  | % Recovery at 3200 Pa | Compliance at 3200 Pa |
|---|---|---|
| Pure bitumen | ~0 | 0.323 |
| Bitumen + 1% PPA | 16.6 | 0.056 |
| Composition 1 | 15.7 | 0.056 |
| Composition 2 | 16.8 | 0.057 |
| Composition 3 | 7.8 | 0.095 |

EXAMPLE 2

An asphalt mixture using the additive mix and procedure described in this invention was produced. A specific asphalt mixture named BBSG 0/10 (Beton Bitumineux Semi-Grenu, France) was produced using the following mineral formula:
Calcareous filler 1.5%
Sand 0/4 48.5%
Aggregates 4/6 14.0%
Aggregates 6/10 36.0%

An amount of 5.6 g of bituminous composition for 100 g of mineral formula described above was used. The temperature of the mineral aggregates was 120° C. and for the bituminous composition it was 160° C. The resulting asphalt mixture was compacted, using a gyratory press. The compacted sample was then cooled down and kept at constant temperature (20° C.) for 24 hours before testing.

Samples were carried out using the bituminous compositions 4 and 5. Composition 4 was prepared by mixing 100 g of 35/50 bitumen with 1.3 g of an additive mix of the following composition: 77 wt % polyphosphoric acid (115% $H_3PO_4$ basis Sigma Aldrich) and 23 wt % of an additive with chemical formula (A-O—$(CH_2CH(CH_3)O)_g$—$(CH_2CH_2O)_h)_d$—P(=O)—$OH_f$ with a value of d between 1 and 2, d+f equal to 3, g equal to 0, h equal to 4 and A being a linear hydrocarbon chain having between 16 and 18 carbon atoms, commercialized by CECA under the trade name Beycostat® A684. Composition 5 was prepared by mixing 100 g of 35/50 bitumen with 1.3 g of an additive mix of the following composition: 77 wt % polyphosphoric acid (115% $H_3PO_4$ basis Sigma Aldrich) and 23 wt % of an ethoxylated fatty acid diamine commercialized by CECA under the trade name Dinoramox S12®. In both cases, the bitumen was preheated to 160° C. and the different additive mixes were added into it while gently stirring for 15 minutes.

A reference sample using pure bitumen, instead of a bituminous composition containing the additive mix was also done in an identical manner. Another reference sample was carried out with the addition of 1% polyphosphoric acid (115% $H_3PO_4$ basis Sigma Aldrich) into the bitumen before mixing with the aggregates.

Indirect tensile tests measurements were carried out on all samples using an Instron universal testing machine on compression at a 50 mm/min rate. Values for the maximal force obtained from the compression curves are shown in Table 2.

As can be observed, the sample done using the composition described in this invention (composition 1) shows a larger value of fracture force than the one done with pure bitumen and with the one where 1% polyphosphoric acid was used. Sample done with composition 5 shows the lowest value observed in this test.

TABLE 2

Fracture force values of tested samples

| Asphalt mixture with 5.3% of: | Max force attained (kN) |
|---|---|
| Pure bitumen | 32.9 |
| Bitumen + 1% PPA | 33.2 |
| Composition 4 | 35.2 |
| Composition 5 | 29.4 |

From these examples, it can be observed that the additive mix according to the present invention allows the production of an asphalt mixture at lower processing temperatures, while preserving the advantages of polyphosphoric acid alone.

The invention claimed is:

1. An additive mix comprising:
   a) at least one polyphosphoric acid and,
   b) at least one compound comprising at least one alkylene oxide repeating unit and/or at least one (P=O) moiety, wherein in compound b), a phosphorus atom is not linked to an oxygen atom of an ethylene oxide unit.

2. The additive mix of claim 1, wherein said at least one compound b) is of the formula (A1) or formula ($A1_B$):

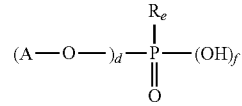

wherein
A is chosen from hydrogen, G,

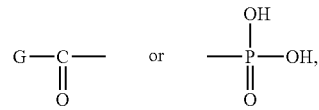

G represents a linear or branched, saturated or unsaturated, $C_1$-$C_{30}$ hydrocarbon chain, optionally containing at least one aromatic cycle, and optionally substituted by at least one phosphate group,
B represents a divalent group containing at least one alkylene oxide repeating unit,
d represents 1 or 2, and
Z represents a radical of formula B1:

wherein P represents phosphorus, R is hydrogen or linear or branched $C_1$-$C_6$ alkyl, f is 0 or 1 or 2, e is 0 or 1, d+e+f is 3, provided that when d is 2, then e is 0 and P is linked to two identical or different, groups [A-O—B—] or [A-O—], and when d is 1, Z may also represent hydrogen or a group G or

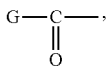

wherein G represents a linear or branched, saturated or unsaturated, $C_1$-$C_{30}$ hydrocarbon chain, optionally containing at least one aromatic cycle, and optionally substituted by at least one phosphate group, wherein in compound b), a phosphorus atom is not linked to an oxygen atom of an ethylene oxide unit.

3. The additive mix of claim 2, wherein said at least one compound b) of formula (A1) comprises from 2 to 1000 propylene oxide (PO) and/or ethylene oxide (EO) repeating units.

4. The additive mix of claim 2, wherein said at least one compound b) of formula (A1) comprises from 4 to 500 propylene oxide (PO) and/or ethylene oxide (EO) repeating units.

5. The additive mix of claim 2, wherein B represents a divalent group containing propylene oxide (PO) and/or ethylene oxide (EO) repeating units, statistically arranged or in blocks.

6. The additive mix of claim 2, wherein B is a statistical or block copolymer of ethylene oxide and propylene oxide with 4 to 500 repeating units, with a mass ratio (ethylene oxide/copolymer) between 1% and 70%.

7. The additive mix of claim 4, wherein said PO and/or EO repeating units are bonded to Z by a single bond or by a linear or branched hydrocarbon chain with, one, two or three carbon atoms.

8. The additive mix of claim 4, wherein the PO and/or EO repeating units are directly bonded to Z.

9. The additive mix of claim 3, wherein the said PO and/or EO repeating units are bonded to Z by a hydrocarbon chain, and component A1 is of the formula $A1_C$:

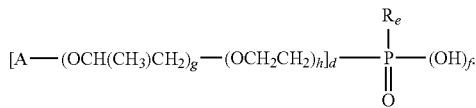

wherein g is between 0 and 80 and h is between 0 and 80.

10. The additive mix of claim 9, wherein g is 0, when A contains at least 10 carbon atoms and g is between 8 and 80, when A contains less than 10 carbon atoms.

11. The additive mix of claim 2, wherein A and Z each represent hydrogen and B is a statistical or block copolymer of ethylene oxide and propylene oxide with 4 to 500 repeating units, with a mass ratio (ethylene oxide/copolymer) between 1% and 70%.

12. The additive mix of claim 2, wherein A and Z each represent hydrogen and B is a triblock copolymer with the propylene oxide forming the middle block, and A1 is of formula $A1_H$:

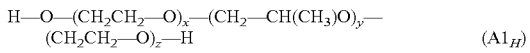

where the sum x+y+z ranges from 4 to 500 and the ratio 44(x+z)/(44(x+z)+57y) ranges from 0.1 to 0.7.

13. The additive mix of claim 2, wherein A represents hydrogen, d is 1, Z represents G or

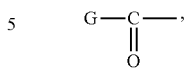

wherein G represents a linear or branched, saturated or unsaturated, $C_1$-$C_{30}$ hydrocarbon chain, optionally containing at least one aromatic cycle, and B represents a divalent group containing at least one propylene oxide repeating unit (PO) and/or at least one ethylene oxide repeating unit (EO).

14. The additive mix of claim 2, wherein d is equal to 1, Z represents B1, and A represents

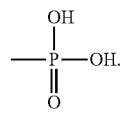

15. The additive mix of claim 2, wherein d is 2, additive A1 is of formula $A1_2$

wherein the two groups (A-O—B) may be identical or different.

16. The additive mix of any of claim 1 comprising from 0.3% to 97.5% by weight, of one or more additives b) and the remaining part to 100% of a polyphosphoric acid (PPA).

17. The additive mix of any of claim 1 comprising from 4% to 66% by weight, of one or more additives b) and the remaining part to 100% of a polyphosphoric acid (PPA).

18. A compound of formula $[A-O—B—]_d Z$, wherein d is 1, Z is

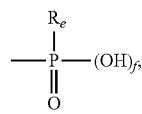

R is hydrogen or linear or branched $C_1$-$C_6$ alkyl, f is 0 or 1 or 2, e is 0 or 1, with d+e+f=3, B is a divalent group containing at least one alkylene oxide repeating unit, and A is

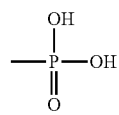

wherein in B, the phosphorus atom of Z is not linked to an oxygen atom of an ethylene oxide unit.

19. A bituminous composition comprising at least one bitumen and from 0.05% to 10% by weight of at least one additive mix according to claim 1.

20. The bituminous composition of claim 19, further comprising one or more additives chosen from among sulfated surfactants, sulfonated surfactants, alkyl or aryl carboxylic acids, fatty acid esters of quaternary alkanol amines, alkyl amido polyamines, alkyl imidazolines and alkyl imidazo polyamines, quaternary ammonium surfactants, zwitterionic surfactants, the products from the reaction between polyamines and fatty carboxylic acids, the products from the reaction between alkyl polyamines and fatty carboxylic acids, the products from the reaction between fatty acids or vegetal oil and diethanolamine, followed by the reaction with polyamines, betain salts and N,N,N-trialkyl choline salts with strong organic or inorganic acids, paraffins, fluxants, esters of fatty acids and functionalized wax, dialkyldiamides, fluxants oils from vegetal or mineral sources and derivatives thereof, as well as mixtures of two or more of the above additional additives, styrene butadiene rubbers, styrene/butadiene block copolymers, ethyl vinyl acetate copolymers, polyethylene and other alpha-polyolefins.

21. An asphalt mixture comprising mineral aggregates and at least one bitumen and from 0.05% to 10% by weight of at least one additive mix according to claim 1.

22. The asphalt mixture of claim 21, further comprising organic fibers and/or inorganic fibers.

23. Process for the preparation of an asphalt mixture comprising adding at least one additive mix of claim 1, as a mixture or as separate components, during mixing bitumen with mineral aggregates.

* * * * *